(12) United States Patent
Hirayama

(10) Patent No.: US 11,800,080 B2
(45) Date of Patent: Oct. 24, 2023

(54) DISTRIBUTION IMAGE GENERATION METHOD

(71) Applicant: Ohmi Digital Fabrications Co., Ltd., Shiga (JP)

(72) Inventor: Takuma Hirayama, Shiga (JP)

(73) Assignee: OHMI DIGITAL FABRICATIONS CO., LTD., Shiga (JP)

( * ) Notice: Subject to any disclaimer, the term of this patent is extended or adjusted under 35 U.S.C. 154(b) by 0 days.

(21) Appl. No.: 16/627,450

(22) PCT Filed: Nov. 29, 2018

(86) PCT No.: PCT/JP2018/044076
§ 371 (c)(1),
(2) Date: Dec. 30, 2019

(87) PCT Pub. No.: WO2019/107513
PCT Pub. Date: Jun. 6, 2019

(65) Prior Publication Data
US 2020/0145637 A1    May 7, 2020

(30) Foreign Application Priority Data
Nov. 29, 2017   (JP) ................................. 2017-228481

(51) Int. Cl.
*H04N 13/194*   (2018.01)
*H04N 13/279*   (2018.01)
*H04N 13/156*   (2018.01)

(52) U.S. Cl.
CPC ......... *H04N 13/194* (2018.05); *H04N 13/156* (2018.05); *H04N 13/279* (2018.05)

(58) Field of Classification Search
CPC .......... G01R 31/71; G06T 2207/30152; G06T 7/0008; G06T 7/521; G06T 7/42; G06T 11/60; G06T 2207/10048; G06T 2207/30164; G06T 5/003; G06T 5/40; G06T 7/0006; G06T 2207/10116;
(Continued)

(56) References Cited

U.S. PATENT DOCUMENTS 5,418,899 A  *  5/1995  Aoki .................... G06T 3/4007
345/668

FOREIGN PATENT DOCUMENTS

JP        2016-015705 A      1/2016
JP        2016015705 A   *  1/2016
(Continued)

OTHER PUBLICATIONS

International Search Report dated Mar. 19, 2019 in corresponding International Patent Application No. PCT/JP2018/044076, filed Nov. 29, 2018 (with English Translation).

*Primary Examiner* — Masum Billah
(74) *Attorney, Agent, or Firm* — GLOBAL IP COUNSELORS, LLP

(57) ABSTRACT

A method for generating a distribution image to be distributed via a network includes acquiring an image taken at least omnidirectionally, and generating a distribution image having a low image-quality part at four corners by thinning out and extracting pixels from the acquired image. The generating includes extracting the pixels by selecting the pixels to be extracted in accordance with a ratio between a circle having a center of the distribution image as an origin and an arc of the circle included in the distribution image.

7 Claims, 7 Drawing Sheets

(58) Field of Classification Search
CPC .... G06T 2207/20024; G06T 2207/20081; G03B 15/00; G03B 37/00; H04N 13/156; H04N 13/194; H04N 13/279; H04N 21/234345
USPC .......................................................... 348/43
See application file for complete search history.

(56) References Cited

FOREIGN PATENT DOCUMENTS

| | | | | |
|---|---|---|---|---|
| JP | 5871571 B2 | * | 3/2016 | ............... G06K 9/32 |
| WO | WO-2007138845 A1 | * | 12/2007 | ............ G06T 3/0018 |

\* cited by examiner (a) FUNCTION FOR ANGLE-OF-VIEW INFORMATION OF 30 deg.

(b) FUNCTION FOR ANGLE-OF-VIEW INFORMATION OF 90 deg.

(c) FUNCTION FOR ANGLE-OF-VIEW INFORMATION OF 127 deg.

DISTRIBUTION IMAGE GENERATION METHOD

CROSS-REFERENCE TO RELATED APPLICATION

This application is a U.S. National Stage application of International Application No. PCT/JP2018/044076, filed Nov. 29, 2018, which claims priority to Japanese Patent Application No. 2017-228481, filed Nov. 29, 2017, the contents of each of which are hereby incorporated herein by reference.

BACKGROUND

Field of Invention

The present invention relates to a method for generating a distribution image.

Background Information

Conventional image distribution systems are known. These systems receive an image taken by a camera with a computer, such as a portable information terminal or a personal computer, at a remote place away from the camera, and displays the received image on a screen of the computer. Such an image distribution system operates as a surveillance system to monitor a room during the resident's absence, for example. Recently an image distribution system equipped with a camera generating a spherical image has been available, and such an image distribution system enables the distribution of an image in a broader range.

JP 2016-15705 A, for example, describes a video distribution device that generates a panoramic image from a spherical image taken by a camera based on equidistant cylindrical projection, and distributes the generated panoramic image. This video distribution device superimposes a high-definition image as a user's focusing part on a low-resolution all-round image. This improves the quality of video distributed to a user, and suppresses the amount of information for video distribution.

SUMMARY

Just superimposing of a high-resolution image on a low-resolution image can give a user a feeling of strangeness when they view such an image, because a boundary will appear on the image due to the resolution difference.

In view of the above-stated problem, an object of the present invention is to provide a method for generating a distribution image that suppresses the amount of information for image distribution without giving a user a feeling of strangeness when they view the image.

To achieve this object, a method of the present invention generates a distribution image to be distributed via a network, and the method includes: acquiring an image that is taken at least omnidirectionally; and generating a distribution image having a low image-quality part at four corners by thinning out and extracting pixels from the acquired image. The generating step extracts the pixels by selecting the pixels to be extracted in accordance with a ratio between a circle having a center of the distribution image as an origin and an arc of the circle included in the distribution image.

To achieve the object, a method of the present invention generates a distribution image to be distributed via a network, and the method includes: acquiring a field of view from a terminal that receives the distribution image; acquiring an image that is taken at least omnidirectionally; and generating a distribution image by extracting pixels from the acquired image. The generating step thins out and extracts pixels from the acquired image based on a function determined in accordance with the acquired field of view.

The function can be configured so that an interval between the pixels for the thinning-out increases from the center of the distribution image toward the outside.

The function can specify a correspondence of an angle relative to a line of user's sight viewed from a center of a solid having the image mapped thereon and a distance from the center of the distribution image, and a maximum value of the distance corresponds to the angle of 180 degrees.

The function can be specified so that pixels on the solid within the field of view are arranged inside of a circular region in the distribution image and pixels on the solid outside of the field of view are arranged outside of the circular region.

The circular region can abut an edge of the distribution image.

The function can be specified so that an angle relative to the line of user's sight is the field of view when the distance is a radius of a circle that defines an outer shape of the circular region.

The present invention generates a distribution image to be distributed to a computer so that, when the distribution image is expanded to a panoramic image, the quality of the image gradually decreases toward the outer edge. This suppresses the amount of information for image distribution without giving a user a feeling of strangeness when they view the image.

BRIEF DESCRIPTION OF THE DRAWINGS

The invention will be explained in more detail hereinafter with reference to the drawings.

DETAILED DESCRIPTION OF THE EMBODIMENTS

Figure 1:
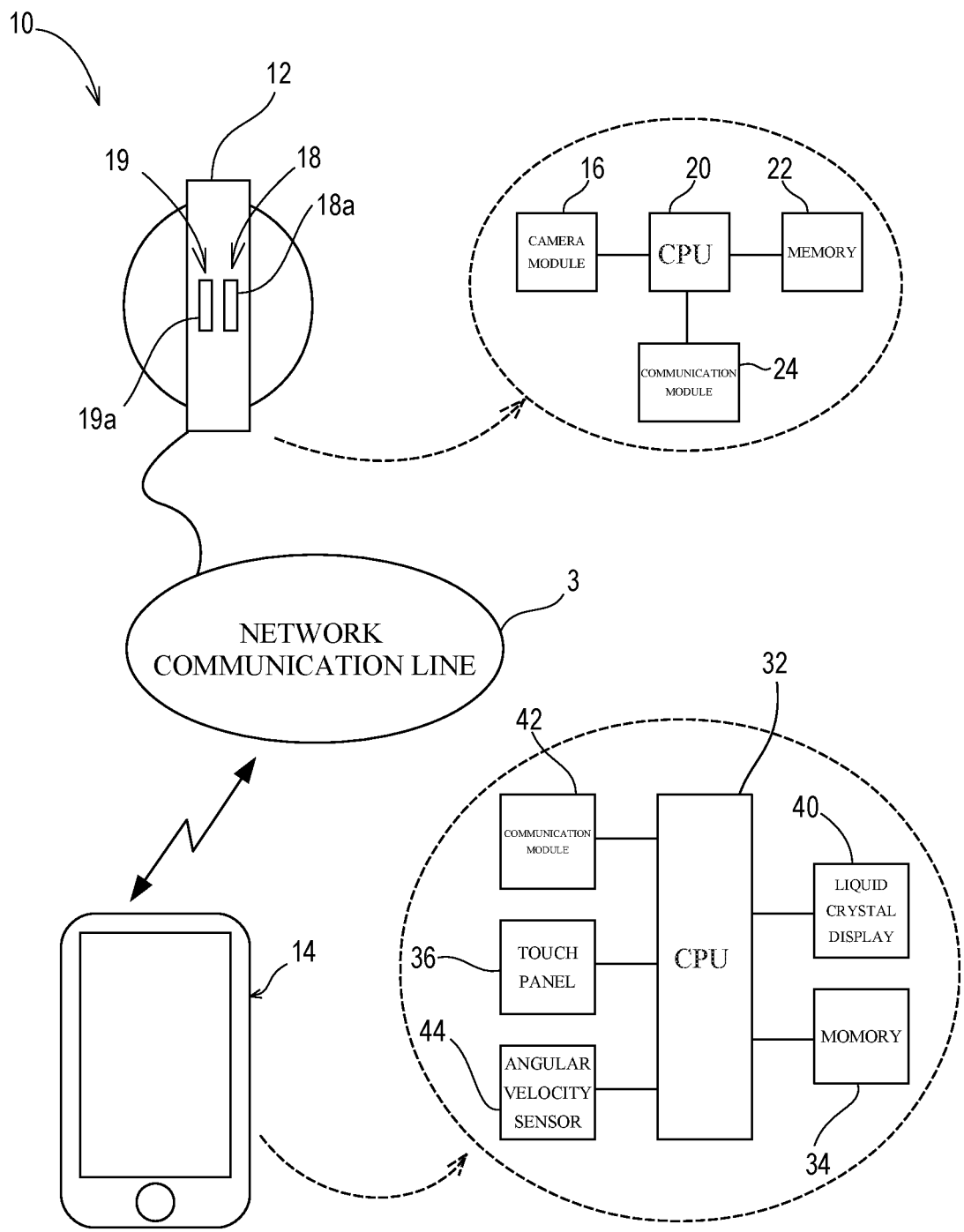
FIG. 1 is a schematic diagram of an image distribution system according to one embodiment of the present invention.

As shown in FIG. 1, an image distribution system 10 of the present embodiment includes an image distribution device 12 connecting to a network communication line 3, and a portable information terminal 14. The image distribution device 12 and the portable information terminal 14 establish a peer-to-peer connection via a signaling server not shown, and so are mutually communicable.

The image distribution device 12 distributes an image through the network communication line 3, and includes a camera module 16 to take a surrounding image. The camera module 16 includes two image sensors 18 and 19. These image sensors 18 and 19 have rectangular light-receiving faces 18a and 19a, respectively, as imaging planes, and output electrical signals in accordance with the intensity of light of the formed images. These image sensors 18 and 19 are disposed so that their receiving faces 18a and 19a are directed in opposite directions. The camera module 16 includes an optical component (fisheye lens) (not shown) to form a hemispherical image (image circle) within the light-receiving faces 18a and 19a of the image sensors 18 and 19. Hemispherical means a half-round face having an infinite radius that is an imaginary half round face centered around the light-receiving faces 18a and 19a of the image sensors 18 and 19.

The camera module 16 has an analog-digital converter (not shown) as well, and this analog-digital converter converts an analog signal output from the image sensors 18 and 19 into a digital signal. This digital signal is input to a CPU 20 of the image distribution device 12 to generate an image. With this configuration, the present embodiment generates two fisheye images formed at the image sensors 18 and 19, i.e., one fisheye image including a hemispherical image in one direction formed at one image sensor 18, and the other fisheye image including a hemispherical image in the other direction formed at the other image sensor 19.

Figure 2:
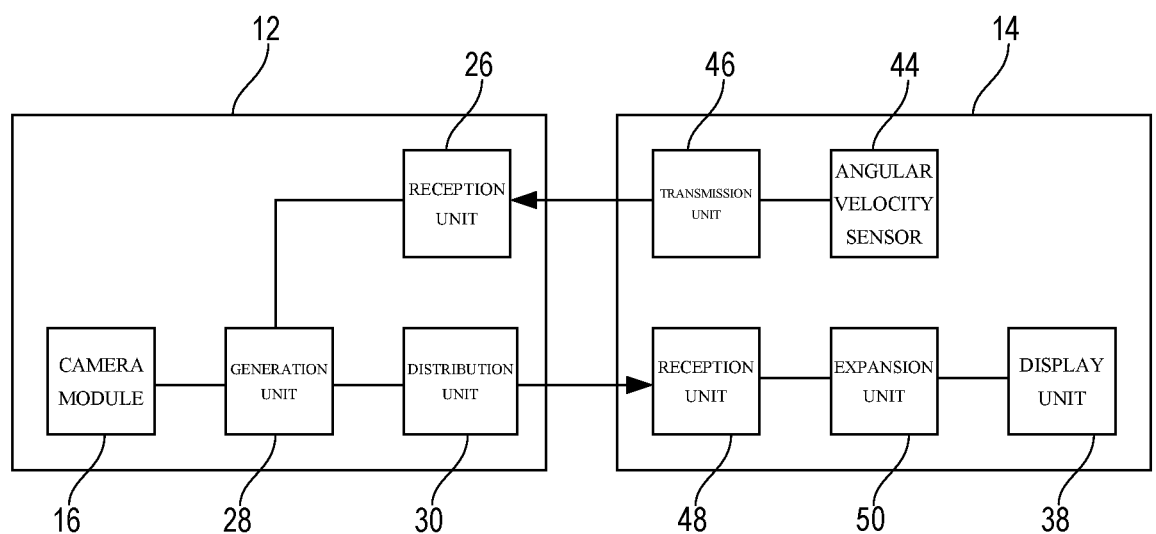
FIG. 2 is a block diagram of the image distribution system.

The image distribution device 12 includes a memory 22 having an image distribution program stored beforehand, and a communication module 24 for connection with the network communication line 3. Execution of the image distribution program by the CPU 20 makes the CPU 20 function as a reception unit 26, a generation unit 28, and a distribution unit 30 as shown in FIG. 2. The reception unit 26 receives field-of-view information and posture information, which are described later, from the portable information terminal 14 via the communication module 24 (FIG. 1). The generation unit 28 generates a distribution image 52 (FIG. 4) based on a digital signal acquired from the camera module 16. The distribution unit 30 distributes the distribution image 52 via the communication module 24.

Referring back to FIG. 1, the portable information terminal 14 typically is a terminal, such as a smartphone or a tablet. The portable information terminal 14 includes a CPU 32 and a memory 34 as well as a touch panel 36 functioning as an input unit (not shown) to receive the input from a user, a liquid crystal display 40 functioning as a display unit 38 (FIG. 2) to display information to the user, the communication module 42 for connection with the network communication line 3, and an angular velocity sensor 44 to detect the posture of the portable information terminal 14.

The memory 34 of the portable information terminal 14 stores an application beforehand to display the distribution image 52 acquired from the image distribution device 12 on the liquid crystal display 40. As shown in FIG. 2, execution of this application by the CPU 32 makes the CPU 32 function as a transmission unit 46 to transmit the field-of-view information and the posture information described later to the image distribution device 12, a reception unit 48 to receive the distribution image 52 from the image distribution device 12, an expansion unit 50 to expand the received distribution image 52, and a display unit 38 to display the expanded image on the liquid crystal display 40.

Figure 3:
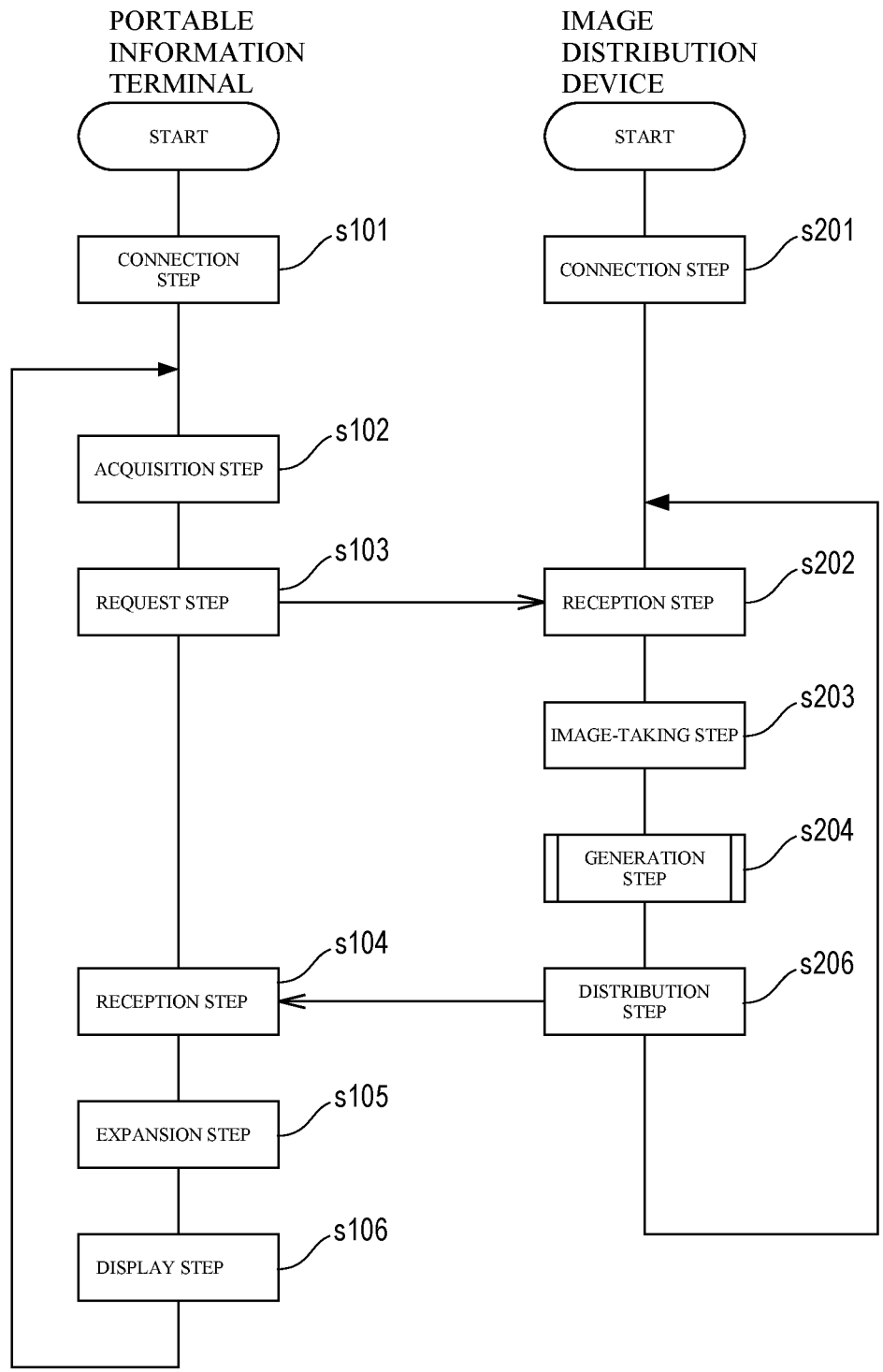
FIG. 3 is a flowchart of the image distribution system.

Referring to FIG. 3, the following describes the flow of image distribution in the present embodiment.

Following the execution of the application in the portable information terminal 14, the portable information terminal 14 executes a connection step (s101) for a peer-to-peer connection with the image distribution device 12.

Following the establishment of a communication with the image distribution device 12 at the connection step (s101), the portable information terminal 14 executes an acquisition step (s102) to acquire field-of-view information and posture information. The posture information indicates the posture of the portable information terminal 14 operated by the user, and typically contains a roll angle (a), a pitch angle (P) and a yaw angle (y) that are determined based on a signal from the angular velocity sensor 44. The field-of-view information indicates the range of an image to be extracted from the taken image to display as a user's focusing part on the liquid crystal display 40 of the portable information terminal 14, and is determined based on the user's zooming operation on the touch panel 36.

Following the acquisition step (s102), the portable information terminal 14 executes a request step (s103) to request distribution of an image. At the request step (s103), the portable information terminal 14 transmits the field-of-view information and the posture information to the image distribution device 12.

Following switching-on and the execution of a connection step (s201), the image distribution device 12 executes a reception step (s202) to receive the field-of-view information and the posture information transmitted from the portable information terminal 14.

Following the reception of the field-of-view information and the posture information, the image distribution device 12 executes an image-taking step (s203). The image-taking step (s203) takes hemispherical images in two directions centered around the image sensors 18 and 19. To this end, the CPU 20 controls the image sensors 18 and 19 and the analog-digital converter to generate these two images based on a digital signal from the analog-digital converter. These images generated at the image-taking step (s203) are fisheye images. Specifically each fisheye image includes a rectangular image region, and this region includes a hemispherical area, which is round in shape and includes the hemispherical image formed at the light-receiving face 18a or 19a of the image sensor 18 or 19, and blank (black) information generated at the surrounding of the hemispherical area (at four corners).

Figure 4:
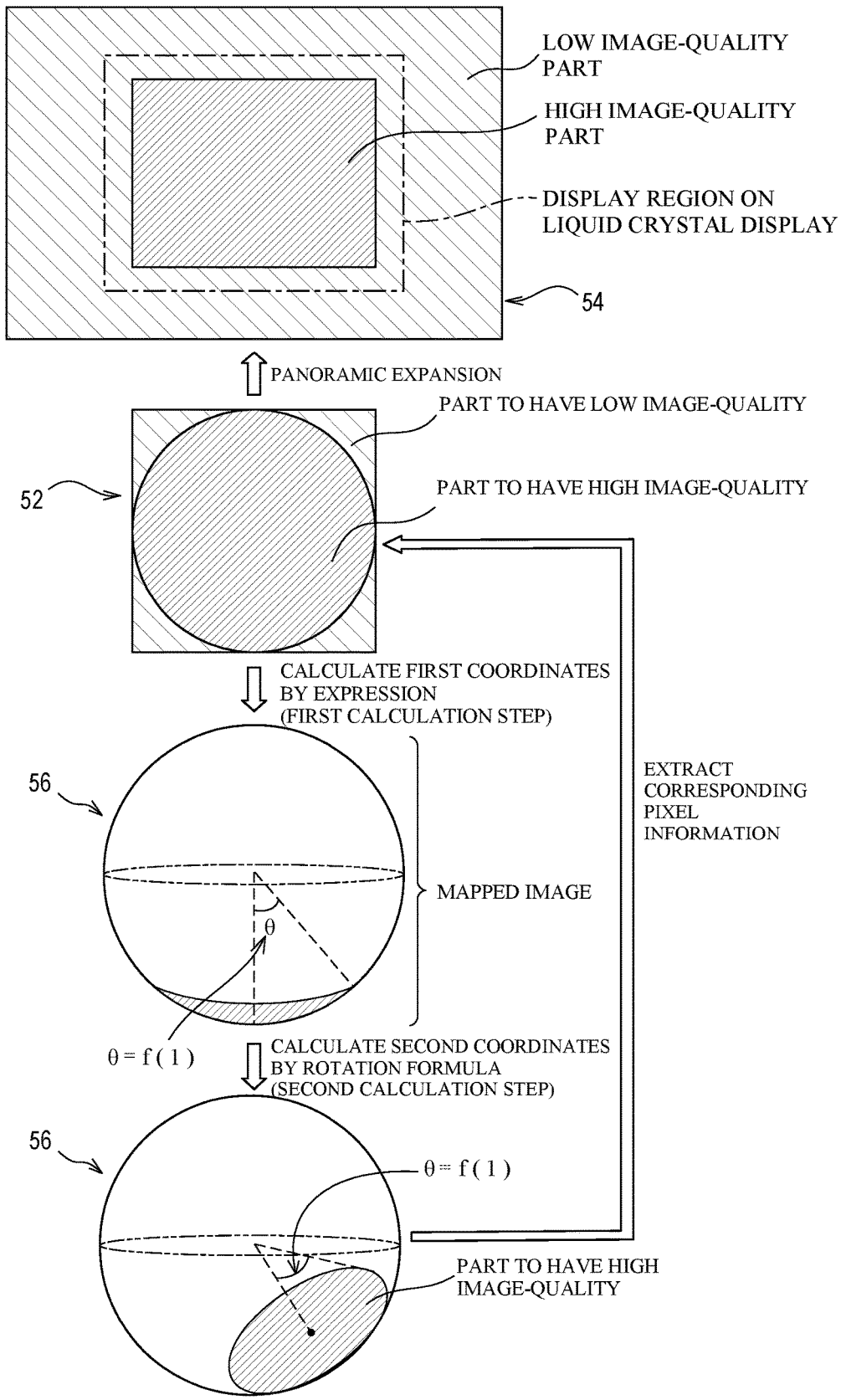
FIG. 4 shows how to generate an image at the generation step in the flowchart.

Following the image-taking step (s203), the image distribution device 12 executes a generation step (s204) to generate a distribution image 52 (FIG. 4). This distribution image 52 is a base image of an image 54 (see FIG. 4) that the portable information terminal 14 expands and displays, and is generated by partially extracting pixels from the taken image based on the field-of-view information and the posture information. Following generation of the distribution image 52, the image distribution device 12 executes a distribution step (s206) to distribute the distribution image 52 to the portable information terminal 14.

The portable information terminal 14 executes a reception step (s104) to receive the distribution image 52 from the image distribution device 12. Receiving the distribution image 52 at this step, the portable information terminal 14 executes an expansion step (s105) to expand the distribution image 52 to the image 54. Following the expansion step (s105), the portable information terminal 14 executes a display step (s106) to display the image 54 on the liquid crystal display 40. Following the display step (s106), every time the user changes the posture of the portable information terminal 14, the portable information terminal 14 executes the above steps (s102) to (s106) and the image distribution device 12 executes the steps (s202) to (s206).

As shown in FIG. 4, the image 54 expanded and displayed in the portable information terminal 14 has a peripheral part having a lower quality than that of the inner (center) part. In other words, the inner part of the image 54 that is a user's focusing part has a higher image quality than that of the peripheral part.

As shown in FIG. 4, the distribution image 52 as a base of the image 54 is a rectangular image, in which a part corresponding to the high image-quality part as stated above lies over a circle (inscribed circle) inscribed in the four sides (edges) of the image and having the center of the distribution image 52 as an origin, and a part corresponding to the low image-quality part as stated above lies from the circumference of the circle to the four corners of the distribution image 52. Pixels of such a distribution image 52 are extracted from the taken image and arranged through a predetermined calculation by the CPU 20. The calculation of the present embodiment extracts pixels corresponding to the pixels in the distribution image 52 from a sphere (hereinafter called a virtual sphere 56) having the two taken images virtually mapped thereon based on the field-of-view information and the posture information.

Specifically as shown in FIG. 4, first coordinates on the virtual sphere 56 corresponding to each pixel of the distribution image 52 are calculated by a predetermined expression in accordance with the field-of-view information (first calculation step), and second coordinates are calculated by applying a rotation formula containing the posture information to the first coordinates (second calculation step). As a result, the pixel information located at the second coordinates is extracted as shown in FIG. 4.

Figure 5A:
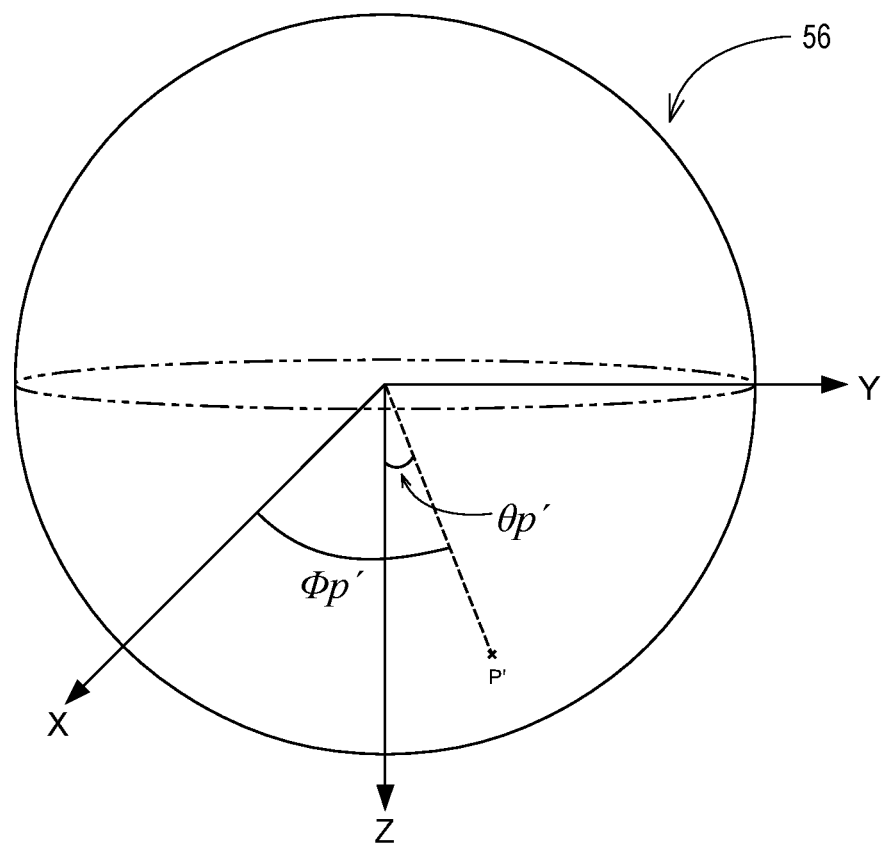
FIGS. 5A and 5B show the correspondence between a distribution image and a virtual sphere.
Figure 5B:
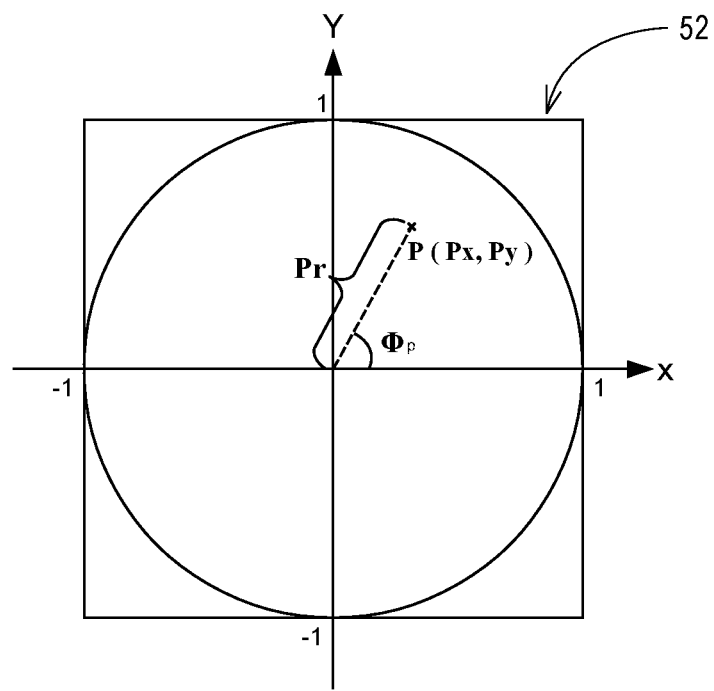

For the purpose of illustration, as shown in FIG. 5B, the coordinates of the distribution image 52 are represented with XY rectangular coordinates having the center as the origin. The horizontal direction (X axis) of the distribution image 52 has values of $-1 \leq X \leq 1$ and the vertical direction (Y axis) has values of $-1 \leq Y \leq 1$. As shown in FIG. 5A, the coordinates of the virtual sphere 56 are represented with XYZ rectangular coordinates having the center as the origin. The radius r of the virtual sphere 56 is set at 1.

The first calculation step calculates the first coordinates to thin out and extract pixels from the taken image in accordance with a function determined based on the field-of-view information. The first calculation step includes a spherical-coordinates calculation step of calculating spherical coordinates $(r,\theta,\phi)$ of the virtual sphere 56 corresponding to each pixel of the distribution image 52 based on the function, and a rectangular-coordinates calculation step of calculating rectangular coordinates $(x,y,z)$ corresponding to the calculated spherical coordinates.

The spherical-coordinates calculation step is described below, by way of an example of point P of the distribution image. The spherical coordinates of point P' on the virtual sphere 56 corresponding to this point P are represented as $(r,\theta_{p'},\phi_{p'})$. The angle $\theta_{p'}$ (angle relative to Z axis on the virtual sphere 56) and the angle $\phi_{p'}$ (the angle relative to X axis) are calculated as follows. As stated above, the radius r of the virtual sphere 56 is 1.

The angle $\theta_{p'}$ can be calculated by inputting the distance $P_r$ from the origin to point P in the XY rectangular coordinates of the distribution image 52 into the function f(r) corresponding to the field-of-view information. The distance $P_r$ can be calculated by the following expression based on the coordinate value $(P_x, P_y)$ of point P.

$$P_r = \sqrt{P_x^2 + P_y^2} \qquad \text{Mathematical Equation 1}$$

Figure 7A:
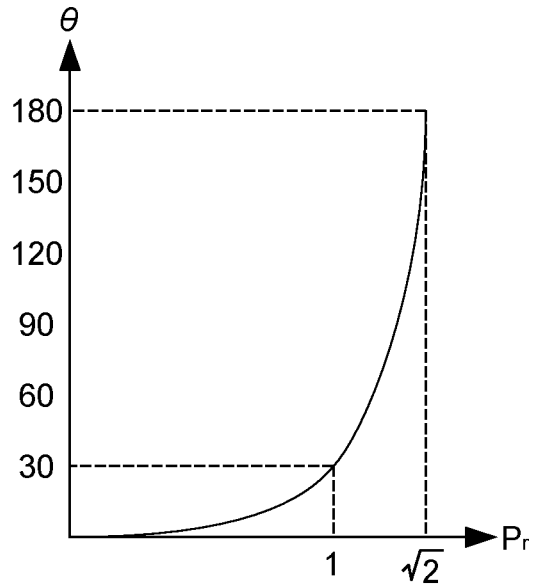
FIGS. 7A-7C show an example of the function.
Figure 7B:
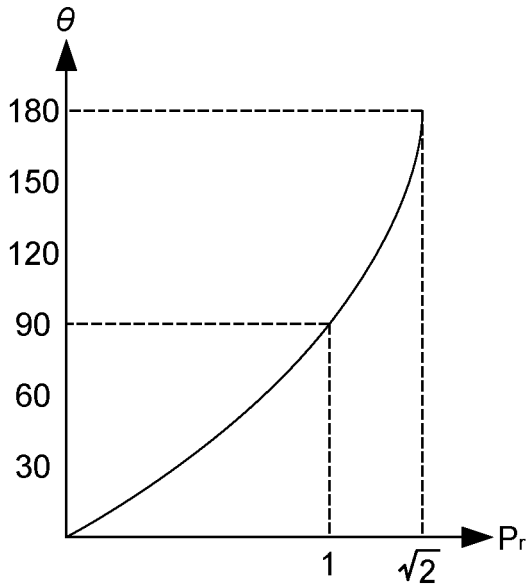
Figure 7C:
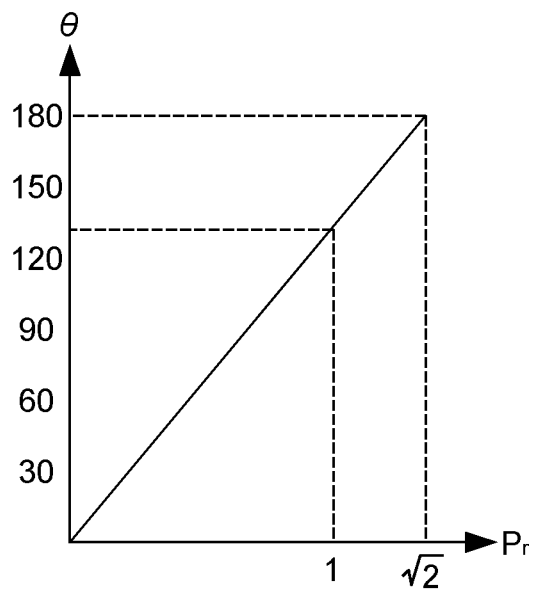

As shown in FIGS. 7A-7C, the function f(r) specifies the relationship between the distance r and the angle θ. The functions f(r) are set so as to correspond to a plurality of pieces of field-of-view information. For example, when the field-of-view information is 30°, as shown in FIG. 7A, the function f(r) is specified so that θ corresponding to r=1 is 30°. Inputting the distance $P_r$ obtained by Mathematical Equation 1 as stated above into this function determines the angle $\theta_{p'}$ corresponding to point P. When the field-of-view information is 90°, as shown in FIG. 7B, the function f(r) is specified so that θ corresponding to r=1 is 90°. Inputting the distance $P_r$ obtained by Mathematical Equation 1 as stated above into this function determines the angle $\theta_{p'}$ corresponding to point P. In this way, each function is set so that the boundary between the high image-quality part and the low image-quality part in the distribution image 52 corresponds to the field-of-view information. As shown in FIG. 7C, this function can be a linear function.

The angle $\phi_{p'}$ is the same as the $\phi_p$ in the XY rectangular coordinates of the distribution image 52, and $\phi_p$ can be calculated by the following expression based on the coordinates $(P_x, P_y)$ of point P.

$$\phi_P = \arctan\left(\frac{P_y}{P_x}\right) \qquad \text{Mathematical Equation 2}$$

Figure 6A:
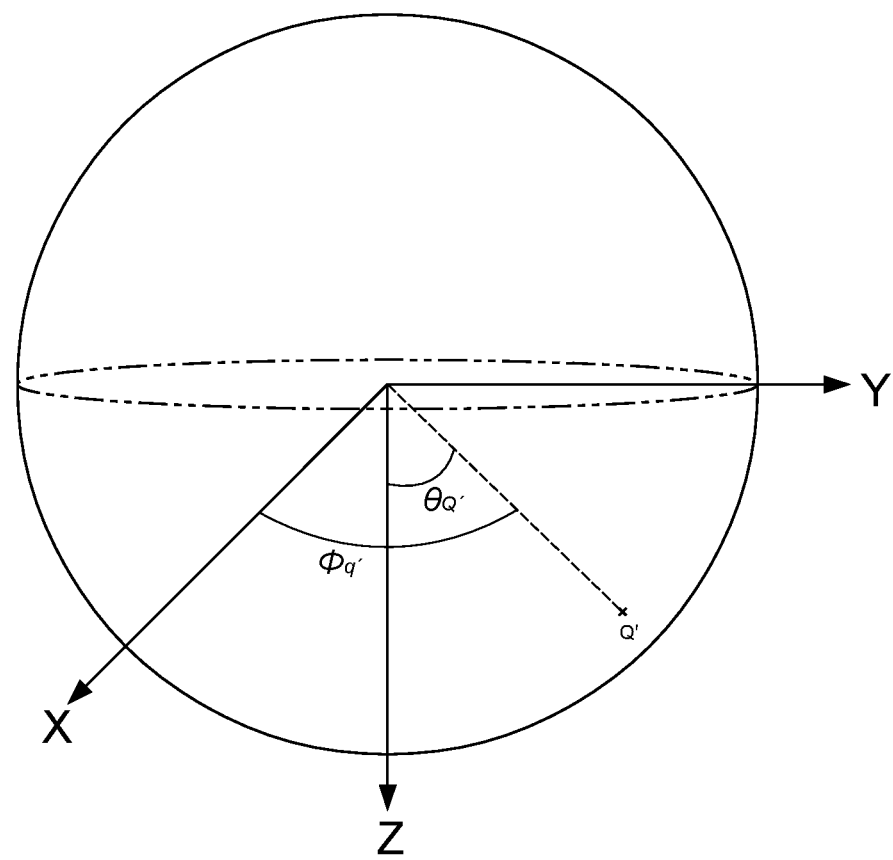
FIGS. 6A and 6B show the correspondence to generate a low image-quality part in the distribution image.
Figure 6B:
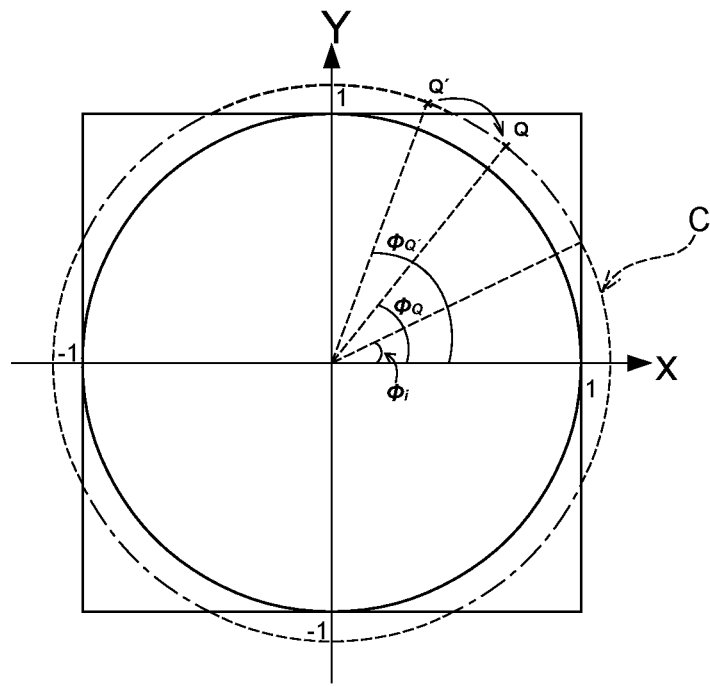

As shown in FIGS. 6A and 6B, when the angle $\phi$ is obtained for a pixel making up the low image-quality part, e.g., a pixel on the circumference C, similarly to the expression (Mathematical Equation 2) as stated above, this causes extraction of unbalanced pixel information, because pixels on the arcs (the dashed-line arc) indicated with the dashed lines are not considered, and pixels on the arcs indicated with the dashed-dotted lines only are considered. To avoid this, the present embodiment selects pixels to be extracted in accordance with the ratio of the dashed arcs to the circumference. Specifically points on the circumference C including the dashed-line parts are evenly arranged along the dashed-dotted line so as to extract less unbalanced pixel information while reducing the amount of information on the distribution image 52. This means that pixel information for pixel Q' will be extracted at the pixel Q on the circumference C, for example. To implement such even arrangement, the expressions are as follows.

$$\phi_{Q'} - 45° : \phi_Q - 45° = 45° : 45° - \phi_i \qquad \text{Mathematical Equation 3}$$

$$\phi_{Q'} = (\phi_Q - 45°) \times \frac{45°}{45° - \phi_i} + 45°$$

$\phi_i$ denotes the angle to calculate the ratio (percentage) of the dotted-line arcs to the circumference C.

In this way the spherical coordinates $(1,\theta,\phi)$ corresponding to each pixel of the distribution image 52 are obtained. Next the rectangular-coordinates calculation step calculates the first coordinates $(x_1,y_1,z_1)$ for each pixel by the following conversion equations.

$$x_1 = r \times \sin\theta \times \cos\phi \qquad \text{Mathematical Equation 4}$$

$$y_1 = r \times \sin\phi \times \cos\theta \qquad \text{Mathematical Equation 5}$$

$$z_1 = r \times \cos\theta \qquad \text{Mathematical Equation 6}$$

Next the second calculation step is executed. The second calculation step applies the rotation formula containing posture information to each of the first coordinates to find second coordinates $(x_2,y_2,z_2)$.

$$\begin{bmatrix} x_2 \\ y_2 \\ z_2 \end{bmatrix} = \begin{bmatrix} \cos\alpha & -\sin\alpha & 0 \\ \sin\alpha & \cos\alpha & 0 \\ 0 & 0 & 1 \end{bmatrix} \begin{bmatrix} \cos\beta & 0 & \sin\beta \\ 0 & 1 & 0 \\ -\sin\beta & 0 & \cos\beta \end{bmatrix}$$
$$\begin{bmatrix} 1 & 0 & 0 \\ 0 & \cos\gamma & -\sin\gamma \\ 0 & \sin\gamma & \cos\gamma \end{bmatrix} \begin{bmatrix} x_1 \\ y_1 \\ z_1 \end{bmatrix}$$

Mathematical Equation 7

The second calculation step as stated above specifies pixels to be extracted from the virtual sphere 56. Specifically the second coordinates are obtained for the coordinates obtained at the first calculation step as shown in FIG. 4. Then pixel information located at the second coordinates are extracted, and the extracted pixel information are assigned to the corresponding each pixel of the distribution image 52. In this way, the distribution image 52 is generated so that the pixels on the virtual sphere 56 in accordance with the field of view are extracted in the form of a fisheye image at a part within the inscribed circle as the high image-quality part, and pixels on the virtual sphere 56 outside of the field of view are thinned out and extracted at a part outside of the inscribed circle as the low image-quality part.

The second calculation step shifts the coordinates calculated at the first calculation step in accordance with the posture information. Therefore, while the angle θ obtained at the first calculation step is the angle relative to the z axis, finally, the calculated angle θ indicates the angle relative to the half line extending from the center of the virtual sphere 56 in accordance with the posture information as shown in FIG. 4. This half line extending in accordance with the posture information corresponds to the line of user's sight viewed from the center of the virtual sphere 56. That is, the angle θ is the index of the angle relative to the line of user's sight viewed from the center of the virtual sphere 56 having the taken image mapped thereon, and the function f(r) specifies the correspondence of this angle and the distance from the center of the distribution image.

As shown in FIG. 7A and FIG. 7B, the function f(r) corresponding to the field-of-view information is set so that the degree of increase of θ increases with the value of r. In other words, the function f(r) is specified so that the clearance between the pixels to be extracted (thinning-out clearance) on the virtual sphere 56 increases from the center of the distribution image toward the outside.

Receiving the distribution image 52 as stated above, the portable information terminal 14 executes an expansion step (s105) to expand the distribution image 52 to the image 54. This step firstly generates an image for expansion based on the distribution image 52. The step arranges the received pixels of the high image-quality part of the distribution image 52 at the center of the image for expansion, and assigns the pixels of the low image-quality part of the distribution image 52 around the high image-quality part. The step does not arrange the received pixels of the low image-quality part as they are. Instead, the step specifies the position of $\phi_{Q'}$ by Mathematical Equation 4 as stated above, and then executes interpolation between the pixels because the pixels without interpolation will not be arranged continuously at a part of $\phi_{Q'}$ on the circumference C. The interpolation is not limited especially. In one example, for a part between pixels on the same circumference, pixel information similar to that of those pixels are arranged.

Following the interpolation, the image for expansion is expanded by a well-known panoramic expansion technique to generate the image 54.

The image distribution system 10 of the present embodiment generates the distribution image 52, which is distributed from the image distribution device 12 to the portable information terminal 14, so that a part corresponding to a part of the expanded image 54 where the user will focus the most has a high image quality, and a surrounding part where the user will focus less is compressed to have a low image quality. In this way the image distribution system reduces the amount of information on the image, and so provides a high quality image to the user while speeding up the communication. The low image-quality part in the image 54 is displayed on the liquid crystal display 40 in accordance with a change of the posture during the duration between the timing of the posture change of the portable information terminal 14 by the user and the timing of expansion of a new image 54 of a new received distribution image 52.

The distribution image 52 is generated so that, when the distribution image 52 is expanded as the image 54 by the portable information terminal 14, the quality of the image gradually decreases toward the outer edge. This suppresses the amount of information for image distribution without giving a user a feeling of strangeness when they view the image.

That is a description of the method for generating a distribution image according to the present invention by way of the embodiment. The present invention is not limited to the above-stated embodiment, and can include the following embodiments, for example.

MODIFICATION EXAMPLES

The spherical-coordinates calculation step in the above embodiment obtains the angle θ of the spherical coordinates based on the predetermined functions (FIG. 7A) corresponding to the field-of-view information. The function is not limited to a predetermined function, and a function can be created based on the acquired field-of-view information. For instance, when the function can be a linear function or a quadratic function, a coefficient corresponding to the field-of-view information can be determined to create the function. When the function is an exponent function, the base corresponding to the field-of-view information can be determined to create the function. To determine these coefficient and base, only a correspondence between the values of these coefficient and base and the field-of-view information can be determined beforehand.

That is, the function can be determined so that the pixels on the virtual sphere 56 within the field of view that the field-of-view information indicates are arranged inside of the circle (inscribed circle) having the center of the distribution image as the origin and the pixels on the virtual sphere 56 outside of the field of view are arranged outside of the circle. Such a function is specified so that, when the distance (r) has the radius of the circle (1 in the above embodiment), the angle θ is the field-of-view information. Typical examples of such a function include a Bézier curve and a spline curve. These curves pass through the point having the angle θ=0 (origin) when the distance (r) is 0, the point having the angle θ=180 when the distance (r) is the maximum value (the distance from the center to the corner of the distribution image), and the point having the angle θ that is the field of view when the distance (r) is the radius of the circle.

The number of the portable information terminal 14 included in the image distribution system 10 is not limited to one, and the image distribution system 10 can include a plurality of portable information terminals. Instead of the portable information terminals 14, the image distribution system 10 can include a desktop-type or a laptop-type personal computer. That is, such a computer can receive the distribution image 52 from the image distribution device 12 and display the image 54. A personal computer can exchange information (field-of-view information and a distribution image 52) with the image distribution system 10 via a browser enabling a Peer-to-Peer communication, for example. The above-stated portable information terminal 14 includes the angular velocity sensor 44 as the means of inputting field-of-view information. In another embodiment, a user can operate the screen with a mouse to input the field-of-view information. The posture information can be on a virtual posture that is obtained based on positional coordinates in the image display unit of the browser designated by the mouse. The field-of-view information can be obtained based on the rotating operation of the mouse wheel.

The image distribution device 12 of the above-stated embodiment includes the camera module 16 configured to take an all-round image. This camera module can include only one image sensor 18 that takes a hemispherical image. The image distribution device having such a camera module can be attached to an indoor ceiling, for example, to take an indoor image, and so can be used as the image distribution device of distributing the situation in the room as the distribution image 52. To generate the distribution image 52, the taken image is mapped onto the lower part of the virtual sphere 52, followed by the first-coordinates calculation step and the second-coordinates calculation step.

The image sensors 18 and 19 of the above-stated embodiment generate a hemispherical image, and they can generate an omnidirectional image at least in all directions. The omnidirectional image refers to an image taken in all directions including north, south, east and west, in other words, an image taken of the surrounding (360-degree in horizontal direction) of a certain point as an origin. Such an omnidirectional image can be a taken image output from the image sensor 18 other than the center part. Alternatively four camera modules each having the field of view of 90-degree are disposed in north, south, east and west directions, and the images from these camera modules can be arranged in the horizontal direction of the virtual sphere for mapping.

The above-stated embodiment maps the taken image generated by the camera module 16 on the virtual sphere 56. In another embodiment, an image taken by the camera module can be mapped on a virtual cube. In such an embodiment, the generation step obtains first coordinates based on a predetermined expression that specifies the correspondence between the position on the distribution image 52 and the position on the virtual cube, and then applies a predetermined rotation formula to the first coordinates to obtain second coordinates. This extracts pixel information on the virtual cube for each of the pixels of the distribution image 52. Similarly the taken image can be mapped on a virtual cylinder.

The above-stated embodiment and modified examples describe the mapping of the taken image on the virtual sphere 56 or the virtual cube, for example. Another embodiment can expand pixel information in the memory 22 based on a predetermined mathematical expression while bearing in mind the mapping of the taken image on a virtual sphere or a virtual cube. Such an embodiment obtains first coordinates based on the above-stated expression for each of the pixels of the distribution image 52, obtains second coordinates based on the above-stated rotation formula, and then extracts pixel information from the memory address corresponding to such second coordinates.

Embodiments of the present invention can be variously improved, altered, or modified based on the knowledge of those skilled in the art without departing from the spirit of the present invention. Any matters specifying the invention can be replaced with other techniques in an embodiment as long as the same action or effects are obtained from the embodiment.

The invention claimed is:

1. A method for generating a distribution image to be distributed via a network, the method comprising:
    acquiring an image taken at least omnidirectionally;
    compressing the image to generate a distribution image having a low image-quality part at four corners by thinning out and extracting pixels from the acquired image,
    the compressing including thinning out and extracting the pixels which are arranged in the low image-quality part from the acquired image by selecting the pixels to be extracted in accordance with a ratio between a circle having a center of the distribution image as an origin and an arc of the circle included in the distribution image; and
    reducing the amount of information on the image to provide a high quality image, and displaying the low image-quality part on a liquid crystal display in accordance with a change of a posture during a duration between the change of the posture of a portable information terminal and a timing of expansion of a new image of a new received distribution image.

2. A method for generating a distribution image to be distributed via a network, the method comprising:
    acquiring a field of view from a terminal that receives the distribution image;
    acquiring an image taken at least omnidirectionally;
    compressing the image to generate a distribution image by extracting pixels from the acquired image,
    the compressing including thinning out and extracting pixels which are arranged in the low image-quality part from the acquired image based on a function determined in accordance with the acquired field of view; and
    reducing the amount of information on the image to provide a high quality image, and displaying the low image-quality part on a liquid crystal display in accordance with a change of a posture during a duration between the change of the posture of a portable information terminal and a timing of expansion of a new image of a new received distribution image.

3. The method for generating the distribution image according to claim 2, wherein the function is configured so that the thinning out of the pixels increases from a center of the distribution image toward an outside.

4. The method for generating the distribution image according to claim 2, wherein the function specifies a correspondence of an angle relative to a line of sight of a user when viewed from a center of a solid based on the image being mapped thereon and a distance from a center of the distribution image, and a maximum value of the distance corresponds to an angle of 180 degrees.

5. The method for generating the distribution image according to claim 4, wherein the function is specified so that the extracted pixels on the solid within the field of view are arranged inside of a circular region in the distribution image and the extracted pixels on the solid outside of the field of view are arranged outside of the circular region.

6. The method for generating the distribution image according to claim 5, wherein the circular region abuts an edge of the distribution image.

7. The method for generating the according to claim 5, wherein the function is specified so that an angle relative to the line of sight of the user is the field of view when the distance is a radius of a circle that defines an outer shape of the circular region.

\* \* \* \* \*